United States Patent [19]

Slayton

[11] E Re. 29,455

[45] Reissued Oct. 25, 1977

[54] HAY BALER TRAILER

[75] Inventor: Darrell E. Slayton, Casey, Iowa

[73] Assignee: Dale E. Slayton, Casey, Iowa

[21] Appl. No.: 636,035

[22] Filed: Nov. 28, 1975

Related U.S. Patent Documents

Reissue of:

[64] Patent No.: 3,826,515
Issued: July 30, 1974
Appl. No.: 420,265
Filed: Nov. 29, 1973

[51] Int. Cl.[2] ..... B62D 21/04

[52] U.S. Cl. ..... 280/106 T; 214/38 CC; 280/35; 280/63; 280/180; 280/400; 296/6

[58] Field of Search ..... 280/106 T, 35, 63, 180, 280/179 R, 179 A, 400, 414 R, 106.5 A, 107; 296/3, 4, 5, 6, 7, 8, 9, 28 M; 214/6 B, 38 CC, DIG. 4

[56] References Cited

U.S. PATENT DOCUMENTS

| | | | |
|---|---|---|---|
| 1,127,130 | 2/1915 | Wartzack | 296/8 |
| 3,148,781 | 9/1964 | Cucarola | 214/6 B |
| 3,189,387 | 6/1965 | Nieto | 214/6 B |
| 3,208,612 | 9/1965 | Blair | 214/6 B |
| 3,319,975 | 5/1967 | Stafford | 296/28 M |
| 3,413,014 | 11/1968 | Franz | 280/400 |
| 3,421,644 | 1/1969 | Butcher | 280/400 X |
| Re. 23,848 | 7/1954 | Gerhardt | 296/3 X |

*Primary Examiner*—Robert R. Song
*Assistant Examiner*—John A. Pekar
*Attorney, Agent, or Firm*—Zarley, McKee, Thomte & Voorhees

[57] ABSTRACT

A trailer for hay bales includes a center longitudinally extending frame member supported on a single axle having wheels at its opposite ends. The trailer is pivotal about the axis of the axle. Forwardly and rearwardly of the axle on opposite sides of the frame member are bale supports cantilevered to the main frame and extending laterally outwardly therefrom for supporting a total of four large round bales. The width of the supports is such that a pair of fork lift fingers can straddle the hay supports when a bale of hay is being transferred onto the support. A pair of center spacer telescopic posts are provided on the main frame between the bale supports.

15 Claims, 3 Drawing Figures

HAY BALER TRAILER

Matter enclosed in heavy brackets [ ] appears in the original patent but forms no part of this reissue specification; matter printed in italics indicates the additions made by reissue.

Bales of hay are different in shape and size. Presently there are the small bales which are either round or square in shape which can be handled by a single person. On the other hand, there are also large round bales, perhaps 6 to 8 feet in diameter, which can be handled only with the assistance provided by lift equipment such as a fork lift mounted on a tractor. It is inconvenient to move these large bales long distances on a lift fork and alternatively the present equipment is not convenient to transfer these bales onto any trailer-type equipment.

The hay bale trailer of this invention is uniquely designed to cooperate with a lift fork on a tractor for transferring the large round bales onto the trailer. The trailer involves a single longitudinally extending frame member supporting on an axle having oppositely disposed ground-engaging wheels. The trailer is pivotal about an axis through the axle. Extending from the frame member on opposite sides thereof forwardly and rearwardly of the axle are bale supports engaging the frame member in cantilever fashion. The bale supports include a pair of spaced apart fingers having a width small enough to enable the fork lift fingers to straddle them when a bale of hay is being transferred onto the bale supports such that the fork lift may be lowered away from the bale support leaving the bale on the bale support. The trailer may include any number of bale supports but preferably includes four, two forwardly and two rearwardly of the axle which results in the trailer being substantially balanced. A tongue is provided at the forward end with a hitch plate at the rear end for connection to a following bale trailer.

A pair of upstanding posts are provided between each of the bale supports on the frame for separating the adjacent ends of the bales.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
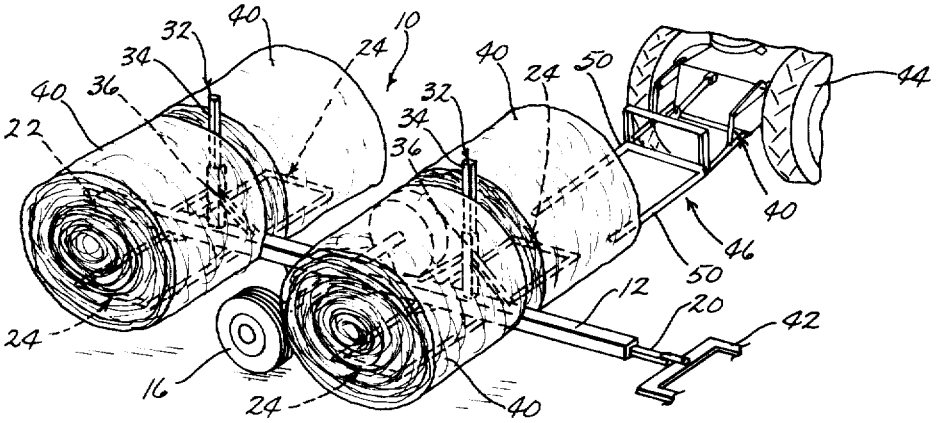
FIG. 1 is a perspective view of the hay bale trailer of this invention showing four bales carried thereon with a tractor having a fork lift for transferring the bales onto the trailer.
Figure 2:
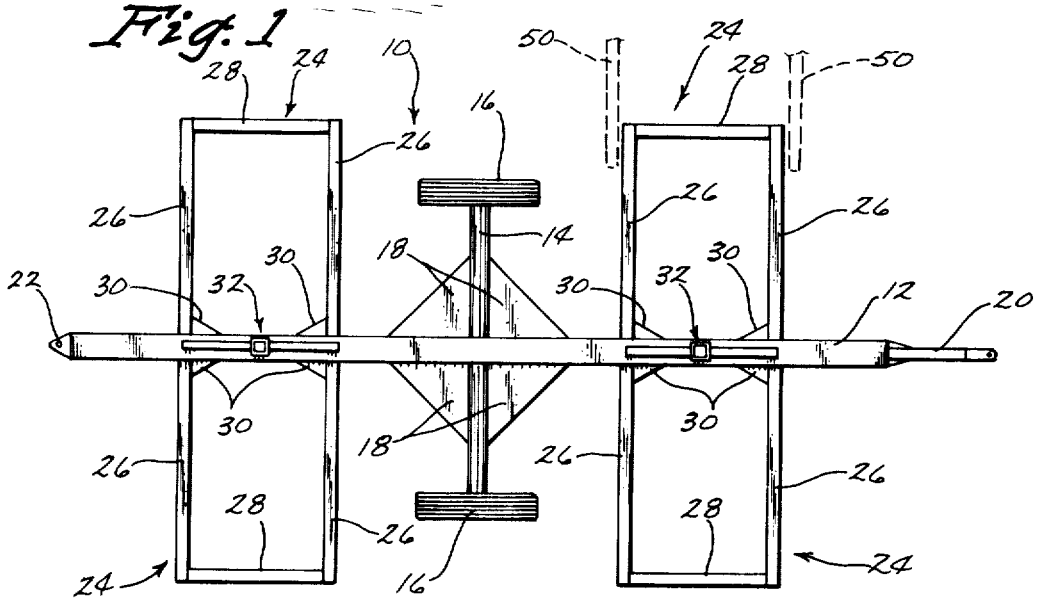
FIG. 2 is a top plan view of the trailer.
Figure 3:
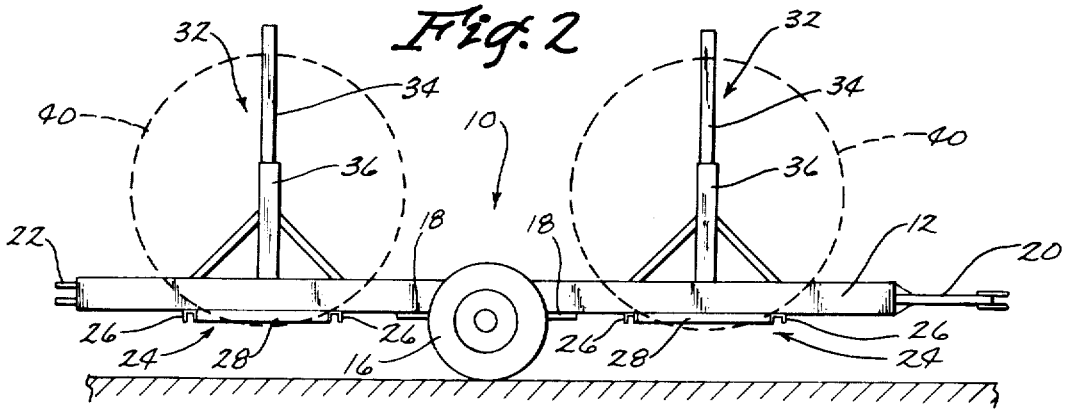
FIG. 3 is a side elevational view thereof.

The hay bale trailer of this invention is referred to in FIG. 1 generally by the reference numeral 10 and is seen to include a main longitudinally extending frame member 12 supported on a single axle 14 having wheels 16 at opposite ends thereof. Four gusset plates 18 are provided for strengthening the trailer and connecting the axle to the main frame as seen in FIG. 2. The axle is located substantially in the center of the frame 12 such that the trailer will pivot about an axis through the axle 14. A tongue 20 is provided on the forward end of the frame 12 while a hitch plate 22 is provided on the rear end for connection to a trailing trailer not shown.

A bale support 24 is provided on opposite sides of the main frame 12 both forwardly and rearwardly of the axle 14 thereby providing a total of four bale supports as seen in the drawings. It is understood that additional bale supports may be provided if desired. Each bale support 24 includes a pair of spaced apart fingers 26 cantilevered to the main frame 12 and extending in parallel relationship outwardly therefrom with a cross member 28 being provided at their outer ends. Gusset plates 30 are provided to strengthen the connection of the support fingers 26 to the main frame 12.

An upstanding post 32 is provided on the frame 12 between the bale supports and includes an upper post 34 telescopically received in a lower post 36. These posts separate the large bales 40 from each other on the bale supports 24.

In operation the hay bale trailer of this invention is pulled into the field by a tractor (not shown) having a drawbar 42 and a second tractor 44 having a fork lift 46 thereon is used for transferring the bales 40 from the ground to the trailer. As seen in FIG. 1, the fork lift 46 is mounted on a three-point hitch 48 which allows the fork lift fingers 50 to be raised or lowered. The fork lift fingers are moved under a bale resting on the ground and then the fork lift is raised with the tractor then being moved into a position for transferring the bale onto the bale support. The fork lift fingers 50 are aligned with the bale support fingers 26 such that as seen in FIG. 2 the fingers 50 straddle the fingers 26. The fork lift is then lowered allowing the bale 40 to rest totally on the support 24 and then the tractor may be driven away to pick up another bale and this same sequence is repeated for each of the supports 24 for a total of four times to provide four bales on the trailer.

I claim:

[1. A hay bale trailer comprising, an elongated longitudinally extending frame member, an axle having wheels at opposite ends supportingly engaging said frame member intermediate its ends, and two pairs of bale supports extending laterally in opposite direction outwardly from said frame on opposite sides thereof, one of said pairs being positioned forwardly of said wheels and the other pair of bale supports being positioned rearwardly thereof.]

[2. The structure of claim 1 wherein each of said bale supports includes two finger members in spaced apart parallel relationship extending laterally from said frame member.]

[3. The structure of claim 2 wherein an upstanding post is provided on said frame member between each of said pair of supports to separate bales of hay on said supports.]

[4. The structure of claim 3 wherein said upstanding posts are telescopic to vary the height thereof.]

[5. The structure of claim 2 wherein said two finger members are spaced apart such that a pair of lift fork fingers can straddle said bale support while unloading bales onto said bale supports by lowering of the bale into the support while the lift fork fingers move below the bale support.]

6. The structure of claim [5] *11* wherein said bale supports are further defined as being cantilivered to said frame member.

7. The structure of claim 6 wherein one end of said trailer is provided with tongue and the other end is provided with a hitch plate for connecting another trailer thereto.

8. The structure of claim [5] *11* wherein said trailer is supported only by said wheels on said axle such that said trailer is pivotable about an axis through said axle.

*9. The structure of claim 8 and a second pair of bale supports extend laterally in opposite directions outwardly from said frame on opposite sides thereof, and said first and second pair of supports are positioned on opposite sides of said axle.*

*10. A hay bale trailer comprising,*

*an elongated longitudinally extending frame member,*

*an axle having wheels at opposite ends supportingly engaging said frame member intermediate its ends,*

*a pair of bale supports extending laterally in opposite direction outwardly from said frame on opposite sides thereof, each of said bale supports including two finger members in spaced apart parallel relationship extending laterally from said frame member, and*

*a telescopic upstanding post on said frame member between each of said pair of supports to separate bales of hay on said supports, said upstanding posts are telescopic to vary the height thereof.*

*11. A hay bale trailer comprising,*

*an elongated longitudinally extending frame member,*

*an axle having wheels at opposite ends supportingly engaging said frame member intermediate its ends, and*

*a pair of bale supports extending laterally in opposite direction outwardly from said frame on opposite sides thereof, each of said bale supports including two finger members in spaced apart parallel relationship extending laterally from said frame member, said two finger members being spaced apart such that a pair of lift fork fingers can straddle said bale support while unloading bales onto said bale supports by lowering of the bale into the support while the lift fork fingers move below the bale support.*

*12. A hay bale trailer comprising,*

*an elongated longitudinally extending frame member having forward and rearward ends,*

*an axle having wheels at opposite ends supportingly engaging said frame member intermediate its ends,*

*a pair of bale supports extending laterally in opposite directions outwardly from said frame on opposite sides thereof and longitudinally spaced from said axle and wheels, each of said supports having longitudinally spaced forward and rear hay support members extending transversely of said frame and each of said members having a transversely extending open area adjacent one side and extending substantially the length thereof whereby a fork having a pair of spaced apart teeth may register with said support members in side-by-side relationship therewith and move vertically above and below the plane of said support members without engaging an obstruction when loading or unloading hay onto each of said supports, and*

*an upstanding stop means on said frame member between the bale supports of said pair of supports to separate bales of hay on said supports.*

*13. The structure of claim 12 wherein said open areas are on the outer rear and forwardmost sides of said support members.*

*14. The structure of claim 12 wherein said support members are connected at their inner ends to said frame member and interconnected at their outer ends by a longitudinally extending frame portion.*

*15. The structure of claim 14 wherein said upstanding posts are telescopic to vary the height thereof.*

*16. The structure of claim 15 wherein said bale supports are further defined as being cantilivered to said frame member.*

*17. The structure of claim 12 wherein one end of said trailer is provided with tongue and the other end is provided with a hitch plate for connecting another trailer thereto.*

*18. The structure of claim 12 wherein said trailer is supported only by said wheels on said axle such that said trailer is pivotable about an axis through said axle.*

*19. The structure of claim 12 wherein said frame includes a second pair of bale supports extending laterally in opposite directions outwardly from said frame on opposite sides thereof.*

*20. The structure of claim 19 wherein one of said pairs of supports are positioned forwardly of said wheels and the other pair of bale supports are positioned rearwardly thereof.*

* * * * *